United States Patent [19]

Kakinuma et al.

[11] Patent Number: 4,860,275
[45] Date of Patent: Aug. 22, 1989

[54] OPTICAL RECORDING CARD AND METHOD OF READING THE SAME

[75] Inventors: Yuji Kakinuma; Minoru Fujita, both of Tokyo, Japan

[73] Assignee: Kyodo Printing Co., Ltd., Tokyo, Japan

[21] Appl. No.: 82,820

[22] Filed: Aug. 5, 1987

[30] Foreign Application Priority Data

Aug. 9, 1986 [JP] Japan .................................. 61-187475
Oct. 21, 1986 [JP] Japan .................................. 61-250460

[51] Int. Cl.$^4$ .............................................. G11B 7/00
[52] U.S. Cl. .................................................. 369/109
[58] Field of Search ...................... 369/109, 53, 55, 56, 369/57

[56] References Cited

U.S. PATENT DOCUMENTS 4,588,882 5/1986 Buxton ................................. 235/487

Primary Examiner—William L. Sikes
Assistant Examiner—Robert E. Wise
Attorney, Agent, or Firm—Martin A. Farber

[57] ABSTRACT

The invention relates to a scheme for correctly reading data pits with a reader even if an optical recording card is fed slantwise.

If the optical recording card is slanted relative to a line sensor for reading the card, the line sensor may ride on two or more data pit columns. However, discriminator pits are formed at the start and end of each data pit column so that the data can be processed after deciding if the optical recording card is disposed slantwise or not.

A relatively short data pit column with discriminator pits formed at the start and end thereof is used. A plurality of data pit columns are disposed with a guide bar interposed therebetween. A readout signal from the discriminator pits is used for deciding if the data pit column has been read correctly, whereas a strobe signal read from the guide bar is used for initiating a memory selector.

7 Claims, 7 Drawing Sheets

OPTICAL RECORDING CARD AND METHOD OF READING THE SAME

BACKGROUND OF THE INVENTION

1. Field of the Invention

The present invention relates to an optical recording card.

Recently, cards with various information recorded therein, such as ID cards, cash cards and bank cards have been widely used. The term "optical recording card" is often used as synonymous with optical memory card.

2. Description of the Related Art

Cards of this type are recorded with various information such as personal data, company data and so on. Such information has been recorded at an earlier stage in the form of visible characters or symbols and at a later stage in the form of electric signals using magnetization. However, there is a need of preventing falsification and of increasing the amount of information.

To this end, a laser card has recently been developed using the semiconductor laser technology. A laser card is provided with information recording medium (optical recording medium) having an optical reflective surface on which concavity and convexity serving as data pits are formed. Data pits are detected to read the information, using a semiconductor laser in accordance with a difference in reflection factors of the concavity and convexity.

Figure 12:
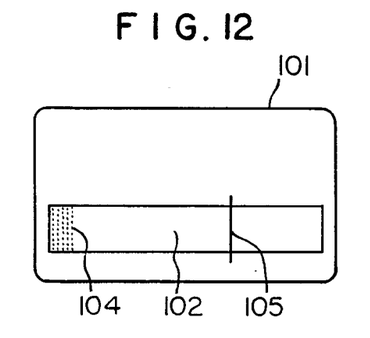
FIG. 12 is a plan view showing a conventional optical recording card.
Figure 13:
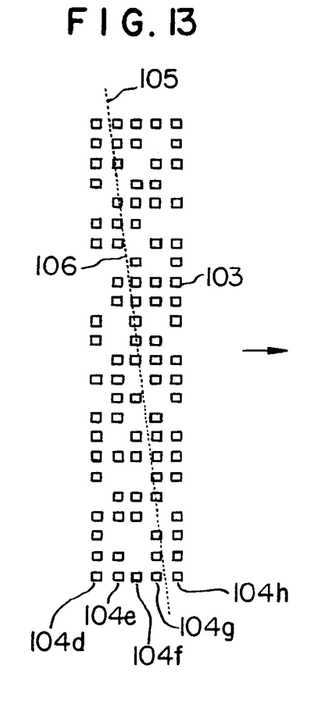
FIG. 13 is a plan view showing the positional relation between data pit columns and a line sensor.

As particularly shown in FIG. 12 and FIG. 13, an optical recording card 101 has a data truck 102 thereon. The data truck 102 has a plurality of pit columns 104d, 104e, 104f, 104g, ... composed of a number of pits 103 aligned on a straight line in the column direction. The data truck is read one pit column after another with an optical reading element 106 by displacing the card 101. A number of optical reading elements 106 aligned on a straight line constitutes a line sensor 105. The line sensor 105 disposed over one pit column is sequentially scanned to read one pit column by one scan.

Figure 14:
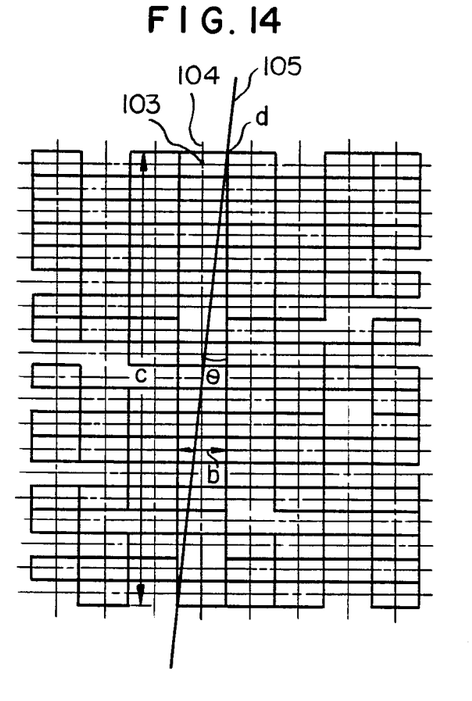
FIG. 14 is an enlarged plan view showing the positional relation between a line sensor of a conventional optical card reader and pit columns.

However, with a conventional optical recording card reader for reading information written in the card with a line sensor 105, it is not possible to correctly read the information unless the pit column 104 on the truck and the line sensor 105 are aligned correctly. FIGS. 13 and 14 show examples of arrangements of the pit column 104 and the line sensor 105 reading the pit column.

Assuming the lateral width of the pit 103 is b and the length of the pit column 104 is c, if the inclination of the line sensor relative to the pit column becomes greater than an angle $\theta$, the line sensor 105 becomes displaced from one pit column to another. Thus, the line sensor 105 will read the gap between pit columns or the other pit column. Even if the inclination is smaller than $\theta$, the line sensor 105 may become displaced from a pit column to be read and may read the gap or the other pit column on condition a read start position d is near the other pit column.

In view of the above, it is necessary to feed the card precisely in order to read it. However, a precise feeding mechanism for adjusting the inclination of a card so as to align a line sensor and a pit column on the card correctly is not practically possible for an optical recording card of a high density data pit. Even if such a precise feeding mechanism is developed, the system with such a mechanism installed on a card reader will become not only bulky but also very expensive. Alternatively, if an inclined data pit column is intended to be corrected and restored using software, the burden on the software becomes substantially great.

In consideration of the above circumstances, it has been desired to develop a technology by which a reading precision can be attained even if the pit column on the truck of an optical recording card and a line sensor are disposed inclined relative to each other.

An example of conventional technology for a skew correction system for an elongated optical data recording medium is described in the specification of U.S. Pat. Application Ser. No. 617,630, now U.S. Pat. No. 4,588,882, which shows some unsatisfactory results.

SUMMARY OF THE INVENTION

The present invention has been made in consideration of the above circumstances and seeks to provide an optical recording card and a method of reading the same which does not need an inclination correction even if the pit column on the data truck and a line sensor are disposed inclined, and can produce an alarm signal when a next pit column is read due to the inclination, to thereby attain reading precision.

To achieve the above object, the optical recording card of this invention is characterized in that a data truck is constructed of a plurality of pits in matrix arrangement and the start and end pits in each column of the data truck are used as redundancy pits which are pits having previously determined different binary values.

According to one aspect of the invention, an optical recording card reading method is provided wherein the optical recording card comprises a plurality of data pit groups with a guide bar interposed therebetween, each data pits group having a plurality of data pits arranged in a matrix of columns and rows, and having redundancy pits which are pits having previously determined different binary values at the start and end pits of each pit column, the method comprising the steps of dividing said data pit columns in accordance with a strobe signal which is generated from detecting each guide bar by the line sensor, reading data pits columns by scanning of said line sensor, causing a memory selector to select data processing memories if the combination of both redundancy pits of each data pit column is consistent with a predetermined combination, and writing the pit column data belonging to the same data pit group into a same data processing memory.

The other objects of the present invention will become understood from the following description and the accompanying drawings.

BRIEF DESCRIPTION OF THE DRAWINGS

FIG. 8 illustrates an example of the arrangement of a data area in a card;

DESCRIPTION OF THE PREFERRED EMBODIMENTS

Figure 1:
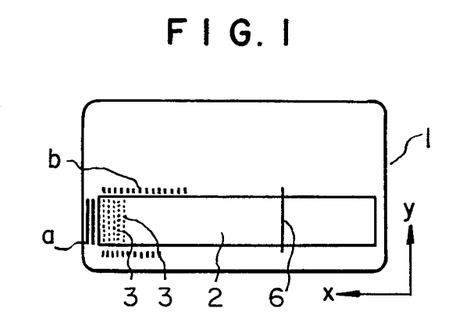
FIG. 1 is a plan view showing the positional relation between an optical recording card and a line sensor.
Figure 2:
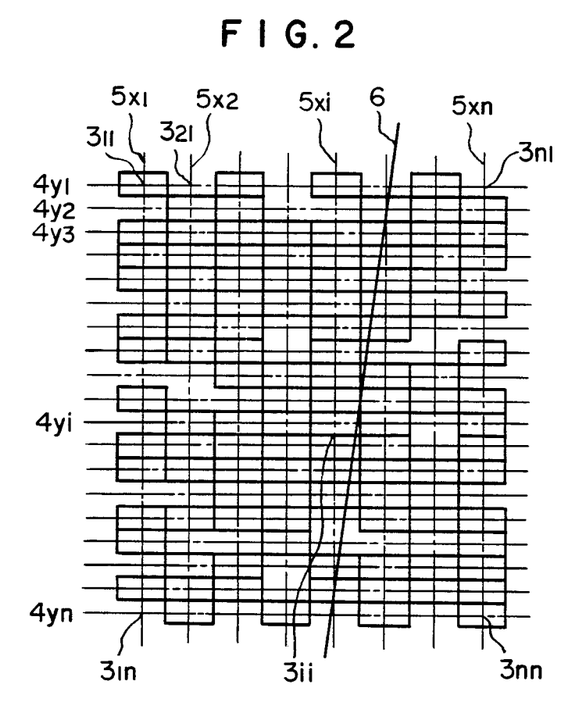
FIG. 2 is a plan view showing the positional relation between a line sensor and pit columns.
Figure 3:
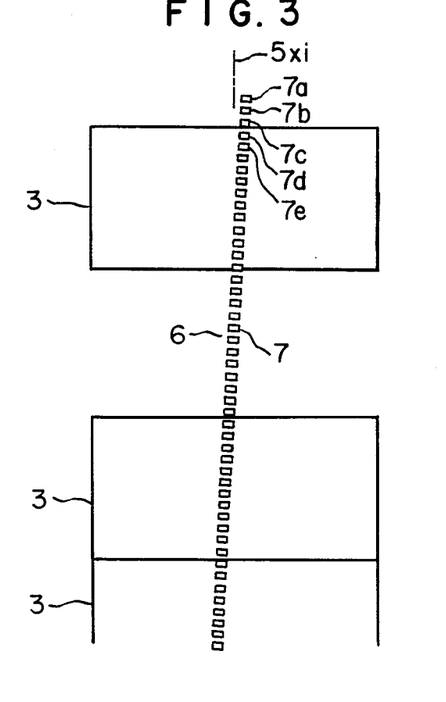
FIG. 3 is an enlarged plan view showing the positional relation between a line sensor and pit columns.

Referring to FIG. 1, a data truck 2 is provided on an optical recording card 1. Information written in the data truck 2 is an object to be read. The data truck 2 is composed of a plurality of pits 3 as shown in FIGS. 2 and 3. A plurality of pits 3 are arranged in matrix of pit rows ($4_{y,1}, 4_{y,2}, \ldots 4_{y,i}, \ldots 4_{y,n}$) and pit columns ($5_{x,1}, 5_{x,2}, \ldots 5_{x,n}$).

In pit columns $5_{x,1}$ to $5_{x,n}$, pits $3_{i,i}$ represent the contents of information to be read except those start pits $3_{1,1}, 3_{2,1}, \ldots 3_{n,1}$ and those end pits $3_{1,n}, 3_{1,n}, \ldots 3_{n,n}$ which are redundancy pits for indicating the position of the card 1. The start and end pits in each column have different binary values. For example, if the start redundancy pit $3_{i,1}$ in a pit column $5_{x,i}$ is "1", the end redundancy pit $3_{i,n}$ is "0". Similarly, if the start redundancy pit $3_{i+1,1}$ in a pit column $5_{x,i+1}$ is "0", the end redundancy pit $3_{i+1,n}$ is "1".

In addition, in a pit row $4_{y,1}$ composed of the start redundancy pits $3_{1,1}, 3_{2,1}, \ldots 3_{n,1}$ of pit columns, respective adjacent pits have different binary values. For example, if the redundancy pit $3_{i,1}$ is "1", the adjacent discriminator pits $3_{i-1,1}$ and $3_{i+1,1}$ are "0".

In a pit row $4_{y,n}$ composed of the end redundancy pits $3_{1,n}, 3_{2,n}, \ldots 3_{n,n}$ of pit columns, respective adjacent pits have different binary values. For example, since the redundancy pits $3_{i,n}$ is "0" in the above example, the redundancy pits $3_{i-1,n}$ and $3_{i+1,n}$ are "1".

As shown in FIG. 3, a line sensor 6 for reading data pits 3 has optical reading elements 7 (7a, 7b, 7c, 7d, 7e...) disposed densely in the Y-axis direction. The line sensor 6 is disposed at a predetermined position. While the optical recording card 1 is moved and the data truck 2 comes to the position of the line sensor 6, a certain pit column $5_{x,i}$ becomes aligned with the line sensor 6. At this time, a number of optical reading elements 7 of the line sensor 6 is sequentially scanned in the y-axis direction to read data pits 3 of the pit column $5_{x,i}$.

Figure 4:
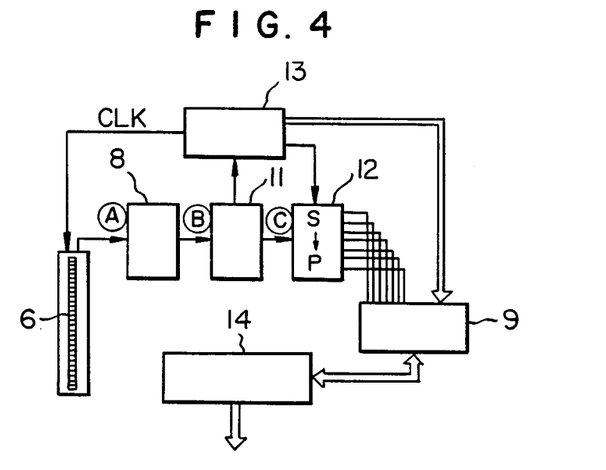
FIG. 4 is a block diagram showing an optical recording card reader.

Referring now to FIG. 4, the line sensor 6 is connected via a binarization circuit 8 and a data compression unit 11, and if necessary via a memory selector 12, to a memory unit 9. Signals from the optical reading elements 7 are stored in the memory unit 9 in synchro with clock signals from a timing control unit 13. The signals stored in the memory unit 9 are applied to and processed by a processor 14.

The binarization circuit 8 compares signals read from the line sensor 6 in synchro with clock signals with a threshold level S to obtain signals from data pits 3. The data compression unit 11 compresses a plurality of signals into one signal.

Next, a method of reading an optical recording card according to the present invention will be described.

Figure 5:
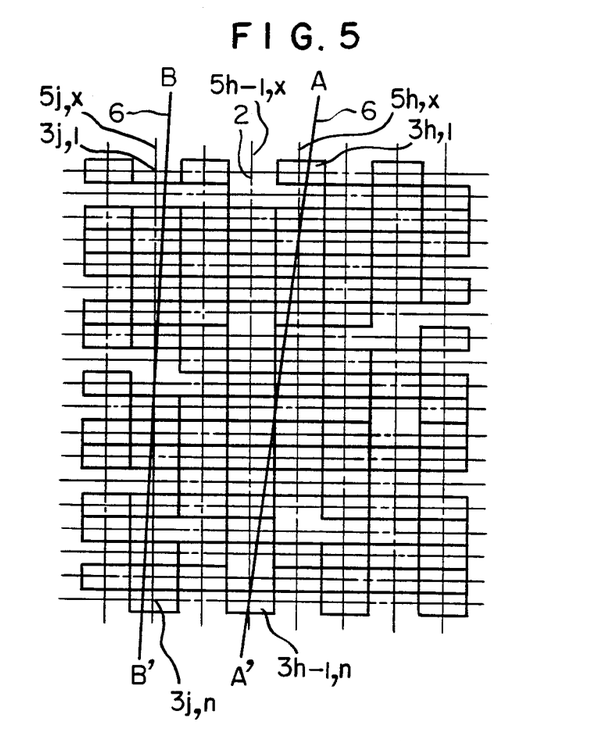
FIG. 5 is a plan view showing the positional relation between a line sensor and pit columns.

Referring to FIG. 5, while the line sensor 6 is shifted finely relative to the card, the data truck 2 is scanned for several times. In this case, the line sensor 6 may ride on several pit columns 5 during one scan, as described previously. FIG. 5 shows a line sensor 6 (A—A') reading two pit columns 5 and a line sensor 6 (B—B') correctly reading one pit column 5.

For the line sensor 6 (A—A'), an exclusive OR of the start and end pits $3_{h,1}$ and $3_{h-1,n}$ of a pit column $5_{h,x}$ $5_{h-1,x}$ becomes 0 (1 XOR 1→0). On the other hands, for the line sensor 6 (B—B'), an exclusive OR of the start and end pits $3_{j,1}$ and $3_{j,n}$ of a pit column $5_{j,x}$ becomes 1 (0 XOR 0→1). Accordingly, it can be decided if the line sensor 6 has correctly read one pit column or erroneously read two pit columns. If an alarm signal is caused to be outputted when the 0 output of an exclusive OR gate is detected, it is possible to recognize that the line sensor 6 has erroneously read two pit columns. As a result, it is possible to re-adjust the mounting position of the card or to again read the truck. In case the line sensor 6 rides on three pit columns, the detection ability becomes invalid. However, in this case, by properly selecting the lateral width b of a pit and the length c of a pit column, such a case may be avoided in the practical sense.

Figure 6:
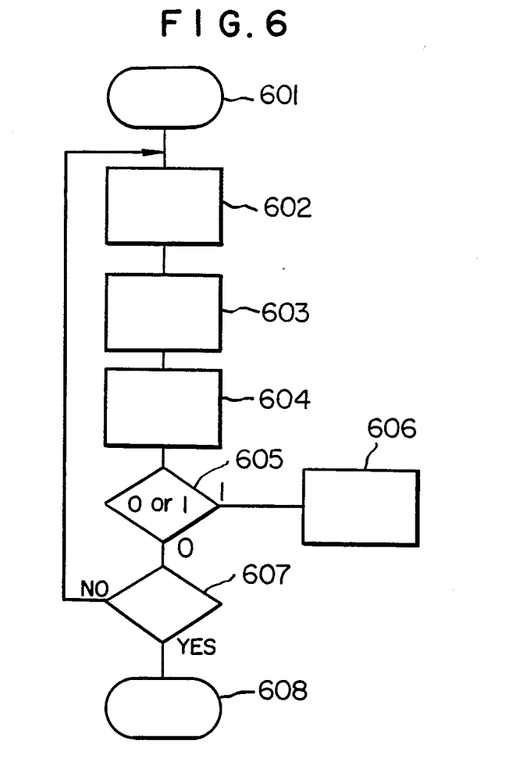
FIG. 6 is a flow chart showing the signal processing.

The procedure of signal processing is shown in the flow chart of FIG. 6. The flow starts at step 601. A card is finely fed at step 602. A line sensor is scanned at step 603. An exclusive OR of the start and end pits is obtained at step 604. It is judged if the exclusive OR is 1 or 0 at step 605. If 1, the read operation is stopped at step 606. If 0, it is decided if the scan is to be stopped or repeated at step 607. If the scan is to be repeated, the flow returns to step 602. If the scan is to be stopped, the flow completes at step 608. Information sensed by the line sensor is binarized by the A/D converter 8 and data-compressed at the data compression unit 11.

The compressed data is serial/parallel converted and stored in the memory unit in the form of 8 bit data. The memory unit 7 has a capacity sufficient for storing several tens data trucks and sends the data to the processor 14 by means of the time sharing method or the like.

The optical recording card according to this invention has the following advantages:

It is assumed that a data truck 1 is constructed of pits disposed in matrix and having a pit size of 10 microns in length and 20 microns in width, one column having 50 pits.

Figure 7A:
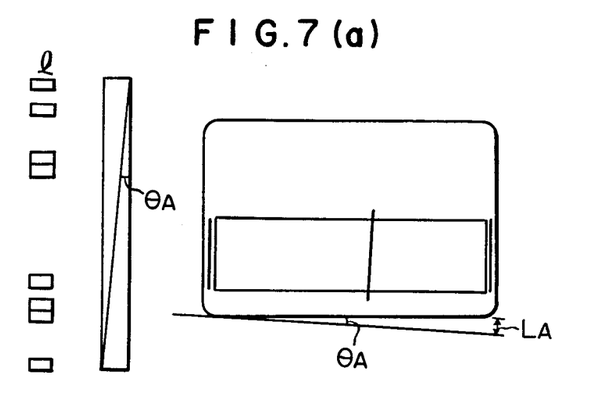
FIG. 7 illustrates the positional relation among pit columns, a card and a line sensor.
Figure 7B:
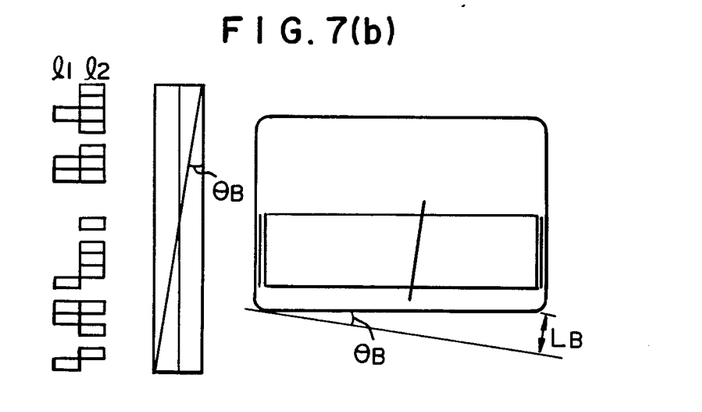

FIG. 7(a) shows a limit angle $\theta_A$ with which one column can be read correctly, whereas FIG. 7(b) shows a limit angle $\theta_B$ with which two columns are read. In other words, if the inclination is larger than the angle $\theta_A$, the line sensor reads two or more columns and if larger than the angle $\theta_B$, three or more columns.

In the above examples, $\theta_A = \tan^{-1}(20/500) = 2.3°$ and $\theta_B = \tan^{-1}(40/500) = 4.6°$. Assuming that the card length is 85.6 mm, the card inclination becomes very large as of $L_A = 3.2$ mm and $L_B = 6.4$ mm.

As understood from the above, if an optical reading card having a proper pit size and data truck length is used, an inclination correction mechanism is not needed but mere adjustment of the card edges can suffice for correct reading. In addition, in case of reading two columns, an alarm signal can be readily outputted using the card of this invention.

FIG. 8 shows one embodiment of an optical reading card of this invention. The card inclination angle θ becomes 2.30° and the displacement amount of the card edges becomes 3.44 mm assuming the following setting values. In such a case, a presently available line sensor 5 can be used to correctly read the card.

|  | Setting Value |
|---|---|
| pit size | width 20 microns × length 10 microns |
| data truck length | column length 500 microns |
| card inclination | θ = 2.30° L = 3.44 mm |
| informatiion recording | NRZ |
| information amount* | 855K bytes (626.0K bytes) |
| data area | 19.0 mm × 72.0 mm |

The information amount * represents the number of pits contained in the data area of 19.0 mm × 72.0 mm on condition that no gap between pits is assumed. The value shown in the parentheses represents that when formatted.

As stated above, according to the method of reading an optical recording card of this invention, an inclination between a line sensor and pit columns, which might be caused during reading the information written in the card, can be corrected without a need of an inclination correction mechanism. Therefore, a certain reading precision can be easily retained, without an expensive reader of complicated construction.

Figures 8A, 8B, 9:
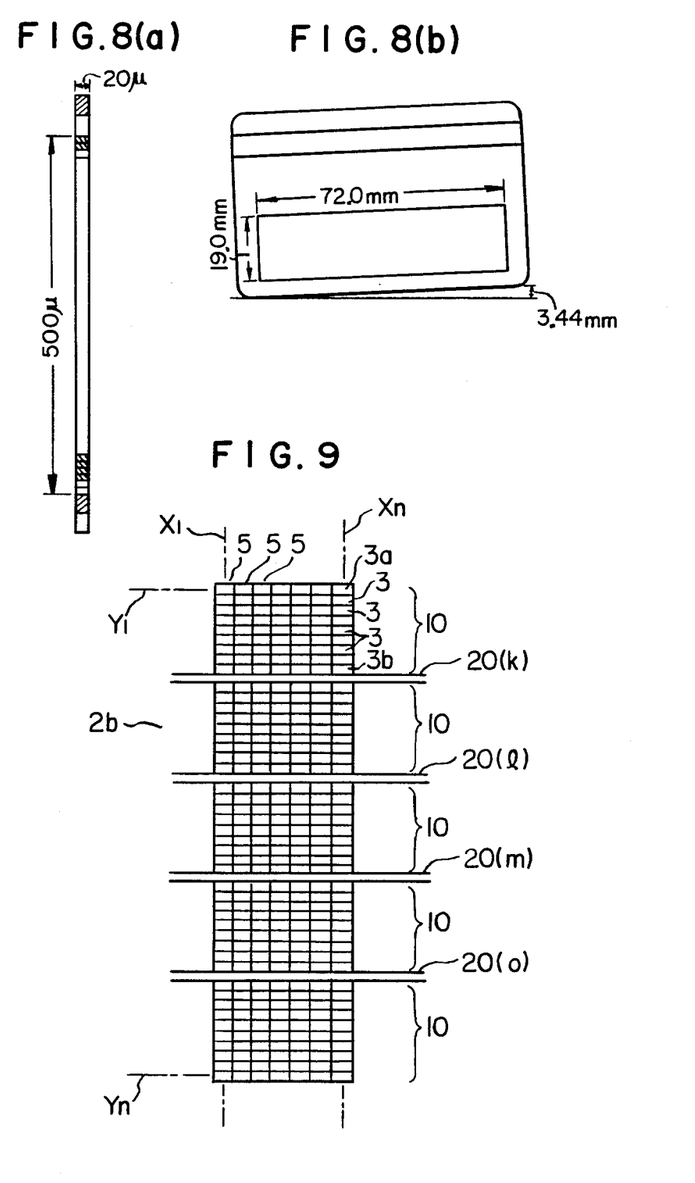
FIG. 9 is an enlarged plan view showing the positional relation between a line sensor and data pit groups.
Figure 10:
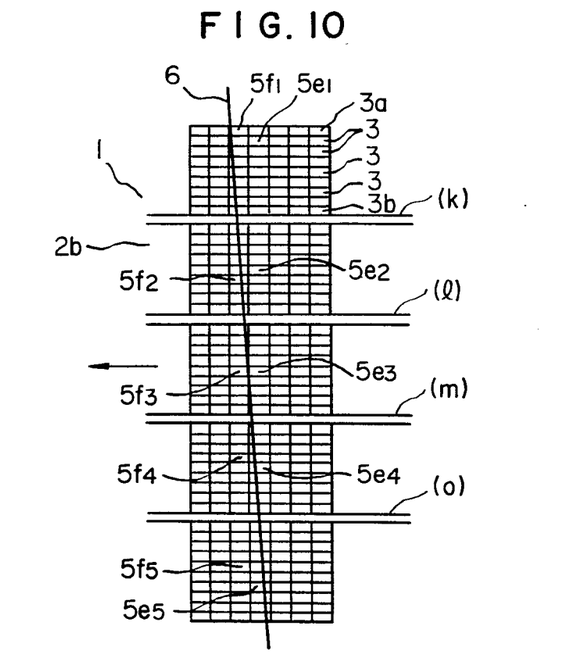
FIG. 10 is an enlarged plan view showing the positional relation between a line sensor and data pit groups.

FIGS. 9 and 10 show another embodiment of an optical recording card according to the invention, wherein a data truck 2b is shown.

As shown in FIG. 9, the data truck 2b is constructed of a $Y_1$ to $Y_n$ rows and $X_1$ to $X_n$ columns.

A number of pits 3 arranged in columns constitute a number of pit column 5. A plurality of pit column 5 ( in case of FIG. 9, seven data pit columns) are arranged in rows to constitute a data pit group 10. A plurality of data pit groups 10 are arranged in columns. A division signal pit 20 is positioned between adjacent data pit columns, the division signal pit 20 indicating the boundary between data pit groups 10. The division signal pit 20 may be constructed of special data pits. In this embodiment, a guide bar representative of photo signals as in the case of a data pit is used as the division signal pit 20. Guide bars k, l, m and o separate adjacent data pit groups in the column direction and guide the movement of a card. At the start and end of each data pit column 5, redundancy pits 3a and 3b are formed. The discriminator pits 3a and 3b are the pits indicating the start and end of each data pit column and have predesignated information. The length of a data pit column 5 is l and the width of a pit 3 is b, which are set to have proper values.

A line sensor 6 for reading pits 3 has a plurality of optical reading elements 7 aligned densely on a straight line. The line sensor 6 is disposed at a predetermined position as shown in FIG. 10. While the optical recording card 1 is guided by guide bars k, l, m and o and moved to the position of the line sensor 6, the data truck 2b comes to the line sensor 6. Then, the line sensor 6 reads pits 3 of each data pit column.

Figure 11:
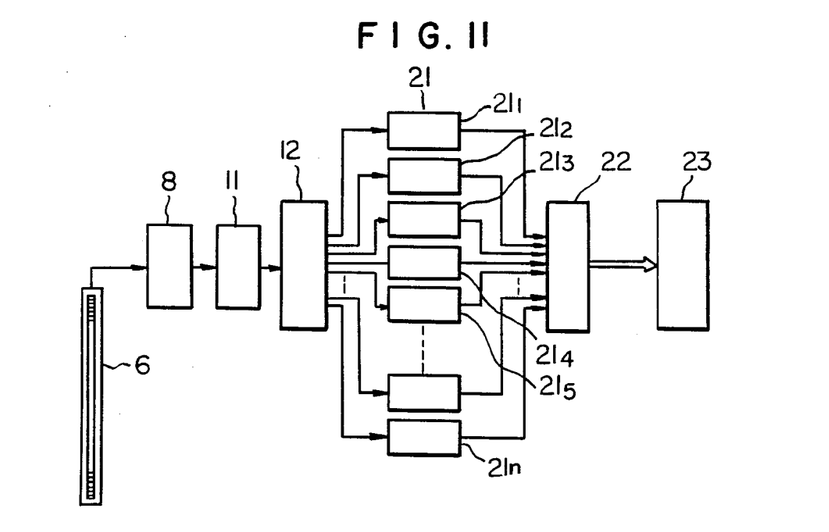
FIG. 11 is a block diagram showing an optical recording card reader.

As shown in FIG. 11, the line sensor 6 is connected via a binarization circuit 8, a data compression unit 11, and a memory selector 12, to data processing memories 21 ($21_1$ to $21_n$). The data processed by the data processing memories $21_1$ to $21_n$ are combined at a data coupling unit 22.

The binarization circuit 8 compares signals read from the line sensor 6 in synchro with clock signals with a threshold level to obtain signals from data pits 3. The data compression unit 11 compresses a plurality of signals into one signal.

Next, a method of reading an optical recording card according to the present invention will be described.

As shown in FIG. 10, while the optical card 1 is conveyed, the line sensor 6 is shifted finely relative to the card to scan the data truck 102. In this case, the line sensor 6 may ride on several pit columns 5 during one scan, as described previously. In the case of FIG. 10, the line sensor 6 rides on data pit columns $5_{f,1}$, $5_{f,2}$, $5_{f,3}$, $5_{e,3}$, $5_{e,4}$ and $5_{e,5}$. Information sensed by the line sensor is binarized by the binarization circuit 8 and data compressed by the data compression unit 11. Simultaneously therewith, it is confirmed if the data in each column has been correctly read using the redundancy pits at both ends of the pit column. The readout data of each column is sent to the memory selector 12.

The compressed data is serial/parallel converted and stored in the data processing memories $21_1$ to $21_n$, processed and combined by the data coupling unit 22 to be sent to the main processor 23.

In the data processing memories 21, the data pit column divided by the memory selector 12 is subjected to data pit compression in the row direction in accordance with redundancy pits. Next, an error detection and correction is performed to complete the readout operation.

Referring again to FIG. 10, the line sensor 6 is inclined relative to a data pit column 5 and rides on six data pit columns $5_{f,1}$, $5_{f,2}$, $5_{f,3}$, $5_{e,3}$, $5_{e,4}$ and $5_{e,5}$. Therefore, during one scan by the line sensor 6, information on the data pit columns $5_{f,1}$, $5_{f,2}$, $5_{f,3}$, $5_{e,3}$, $5_{e,4}$ and $5_{e,5}$ is mixed. Thus, there is a possibility of erroneously reading the information on another data pit column. To avoid this, strobe signals generated by the guide bars k, l, m and o between data pit columns are used while the line sensor 6 is scanning the data truck 2b. In accordance with a change of strobe signal from H to L when the line sensor passes the guide bar, the readout data is separated and processed.

The line sensor 6 reads the data pit columns $5_{f,1}$, $5_{f,2}$, $5_{f,3}$, $5_{e,3}$, $5_{e,4}$ and $5_{e,5}$. However, only the data pit columns $5_{f,1}$, $5_{f,2}$, $5_{e,4}$ and $5_{e,5}$ can be correctly read, and the data pit columns $5_{f,3}$ and $5_{e,3}$ are not correctly read since the line sensor 6 rides on the two pit columns.

In such a case, the memory selector 12 is notified by the redundancy pits 3a and 3b that the data pit columns $5_{f,3}$ and $5_{e,3}$ at the third data pit group were not correctly read, to thus make the third pit group data invalid.

In the meantime, upon reception of strobe signals from the guide members, the memory selector 12 separates data for the transmission thereof. Upon request from the memory selector 12, the data processing memories $21_1$ to $21_n$ immediately stops the processing and waits for the reception of data. In other cases, i.e., if the memory selector 12 does not access the data processing memories, the former and the latter are completely isolated to perform data processing during such a period.

In each data processing memory 21, it is checked if the effective data read at the previous scan is overlapped upon the present effective data being confirmed by an output of the exclusive OR of the redundancy pits. If it is overlapped, it is compressed as same data.

The data is further subjected to an error detection and correction to restore the original data which is temporarily stored. When the stored data becomes more than a necessary data amount, the data coupling unit is notified of such an effect and if it requests, the data is sent out.

The optical recording card with the data truck 2b and the reading method according to the present invention have the following advantages:

With the optical recording card and the method of reading the same according to the present invention, the inclination between a line sensor for reading information written in the card and a data pit column can be corrected without mechanical inclination correction means. Thus, a reading precision can be retained easily. Further, several short data pit columns can be read collectively at a time, thus improving a reading speed.

Moreover, according to the present invention, a high speed data transfer by a line sensor is not degraded, and the signal processing can be performed in parallel.

In addition, if the data of a data bit column at a certain row is arranged to be transferred to a predetermined data processing memory, the data of the upper and lower data pit columns will not be mixed. Thus, the amount of data to be handled becomes small and the reliability is improved. Further, since all the data pit columns can be handled with the same signal processing, the development cost can be reduced because the same signal processing can be used for all the columns.

What is claimed is:

1. An optical recording card comprising
a data truck constructed of a plurality of pits in matrix arrangement, and wherein
the start and end pits in each column of the data truck are redundancy pits which are pits having previously determined different binary values.

2. An optical recording card according to claim 1, wherein said start and end redundancy pits in each column of said data truck have different binary values and wherein said start and end redundancy pits at a same row and adjacent to each other have different binary values.

3. An optical recording card according to claim 1, wherein a plurality of said data pit columns are disposed in the row direction of said matrix to form a data pit group, a plurality of said data pit groups are disposed in the column direction of said matrix with a guide bar disposed in the row direction between adjacent data pit groups.

4. An optical recording card according to claim 1, wherein the data pits have a pit size of substantially 10 microns in length and 20 microns in width, and one column has substantially 50 pits.

5. A method of reading an optical recording card wherein the optical recording card comprises a plurality of data pit groups with a guide bar interposed therebetween, each data pits group having a plurality of data pits arranged in a matrix of columns and rows, and having redundancy pits which are pits having previously determined different binary values at the start and end pits of each pit column, the method comprising the steps of:
dividing said data pit columns in accordance with a strobe signal which is generated from detecting each guide bar by said line sensor;
reading data pits columns by scanning of said line sensor;
causing a memory selector to select data processing memories if the combination of both redundancy pits of each data pit column is consistent with a predetermined combination; and
writing the pit column data belonging to a same data pit group into a same data processing memory.

6. A method according to claim 5, wherein said start and end redundancy pits in each column of said optical recording card have different binary values and wherein said start and end redundancy pits at a same row and adjacent to each other have different binary values.

7. A method according to claim 5, wherein a plurality of said data pit columns are disposed in the row direction of said matrix to form a data pit group, a plurality of said data pit groups are disposed in the column direction of said matrix with a guide bar disposed in the row direction between adjacent data pit groups.

* * * * *